G. E. HENRY.
APPARATUS FOR REMOVING HULLS FROM GRAIN.
APPLICATION FILED JULY 3, 1907.
938,323.
Patented Oct. 26, 1909.
3 SHEETS—SHEET 3.
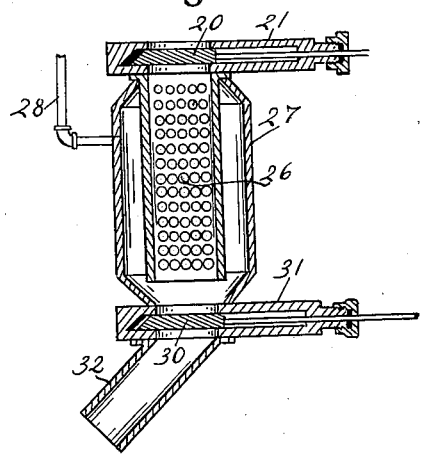
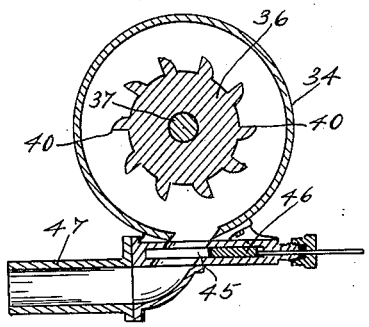
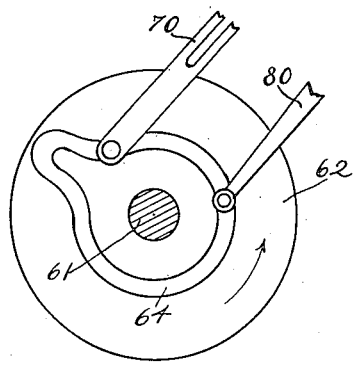
WITNESSES:
W. M. Gentle.
N. Allimong.
INVENTOR.
George E. Henry.
BY
T. H. Lockwood
ATTORNEY.

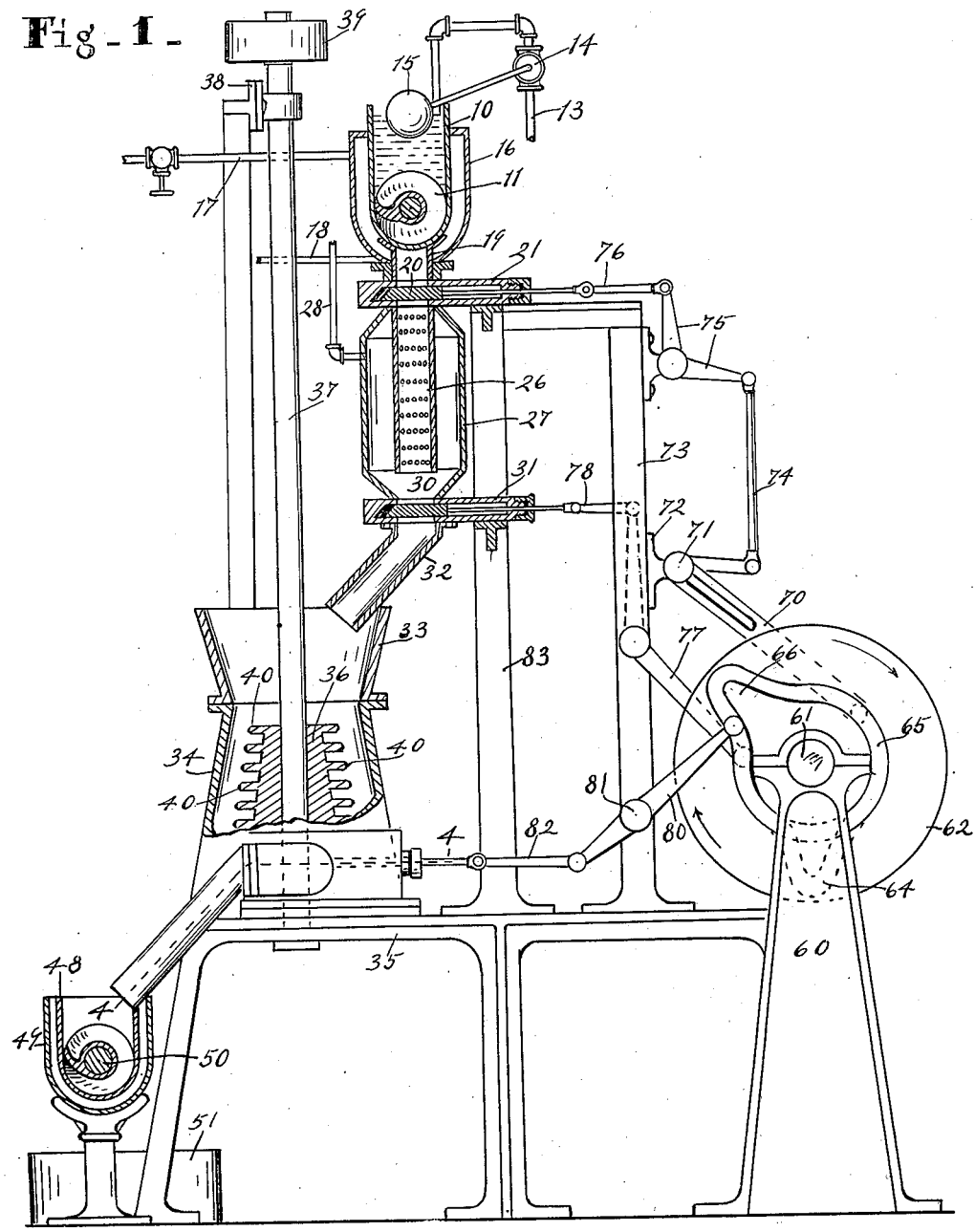

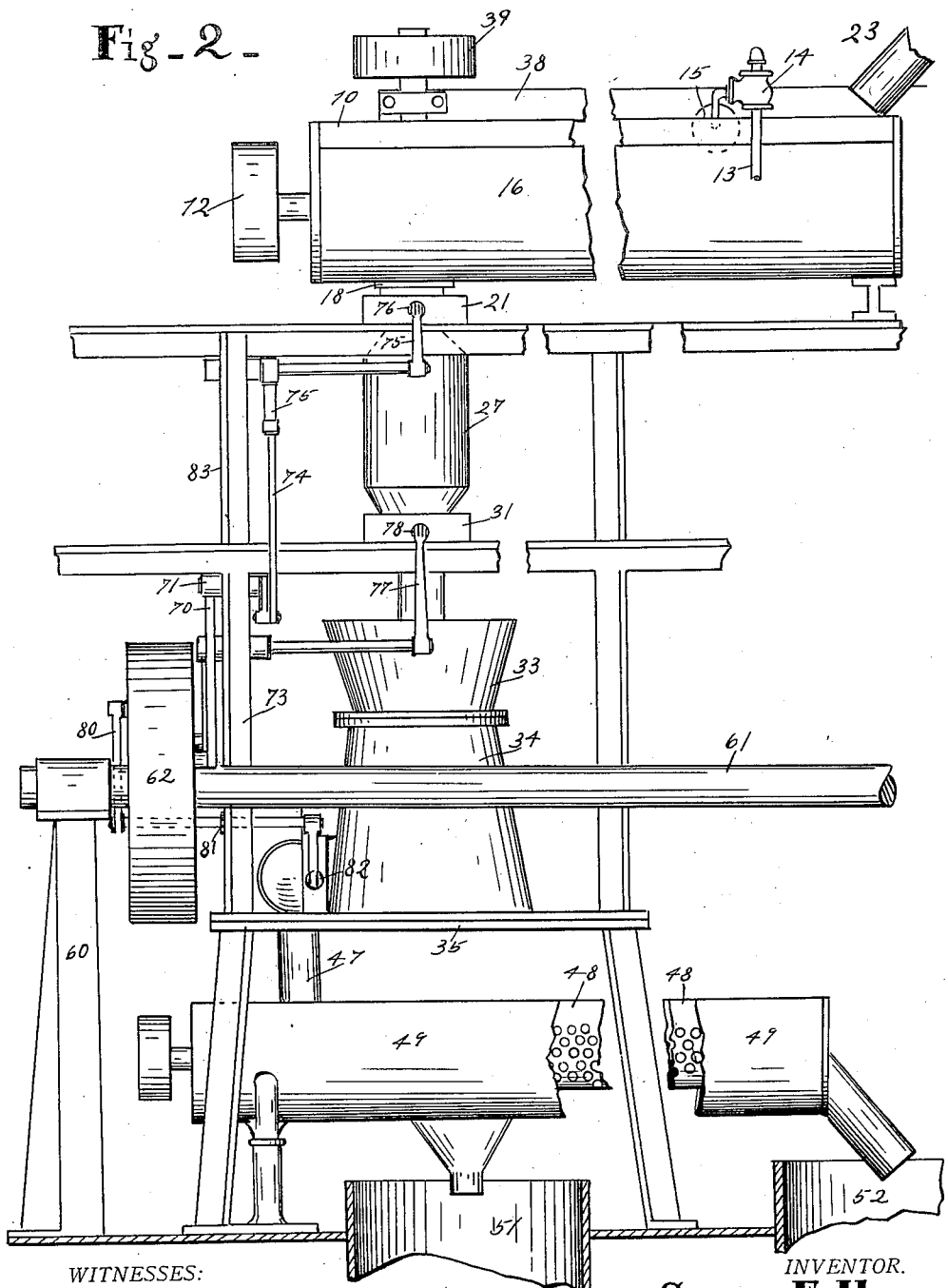

UNITED STATES PATENT OFFICE.

GEORGE E. HENRY, OF VINCENNES, INDIANA, ASSIGNOR OF ONE-HALF TO BENJAMIN G. HUDNUT, OF TERRE HAUTE, INDIANA.

APPARATUS FOR REMOVING HULLS FROM GRAIN.

938,323.

Specification of Letters Patent.    Patented Oct. 26, 1909.

Application filed July 3, 1907. Serial No. 382,013.

*To all whom it may concern:*

Be it known that I, GEORGE E. HENRY, of Vincennes, county of Knox, and State of Indiana, have invented certain new and useful Apparatus for Removing Hulls from Grain; and I do hereby declare that the following is a full, clear, and exact description thereof, reference being had to the accompanying drawings, in which like numerals refer to like parts.

This invention relates to apparatus for treating corn, wheat and other cereals with the object of removing the outside skin, covering or hull, in preparing the grain for use in the various arts.

The chief object of the invention is to remove the outer covering, skin or hull from the kernels of grain without breaking, crushing or otherwise injuring the kernels; also to be able to treat relatively large quantities of grain in relatively short periods of time.

In removing the outer skin, covering or hull by mechanism heretofore employed the grain has been subjected to friction, grinding or bruising, whereby the kernel was broken, crushed and otherwise mutilated, thereby injuring the same in appearance, texture and otherwise disqualifying it for use in preparing so-called "whole grain products."

The object of this invention is to avoid the difficulty mentioned and reduce the cost of such treatment of grain.

The full nature of this invention will be understood from the accompanying drawings and the following description and claims.

In the drawings Figure 1 is a transverse section of the mechanism showing some parts in side elevation and parts broken away. Fig. 2 is a rear elevation of the mechanism, with parts broken away. Fig. 3 is a central vertical section through the two-chambered vat or receptacle and its outlet and valves for controlling it. Fig. 4 is a substantially horizontal section on the line 4—4 of Fig. 1. Fig. 5 is a side elevation of the cam wheel shaft in section.

The corn, wheat or other grain is shelled, threshed or otherwise reduced to free grain before it is introduced into this apparatus. In that form it enters the conveyer trough 10, which is partially cylindrical in cross section and has in its bottom a screw conveyer 11 driven by the pulley 12. This trough is kept filled with hot water supplied through the hot water pipe 13 and the admission of the water is regulated by a valve 14 controlled by the float 15 which rides upon the surface of the water in the trough 10. A closed steam jacket 16 embraces the sides and bottom of said trough 10 and steam is supplied thereto through the steam pipe 17 leading through some suitable source of supply. A drain pipe 18 leads from the lower part of said steam jacket. The outlet 19 from said trough 10 is closed by the slide valve 20 operating in the valve casing 21. Since the trough 10 is filled with hot water and the grain, the action of the conveyer thoroughly mixes the same, thereby thoroughly soaking the grain in the hot water. The temperature should always be below a cooking temperature and otherwise such as is best adapted for the particular grain being treated, that being dependent upon the condition and age of the grain. The grain is introduced into the conveyer trough through the spout 23 so that it will travel the length of the trough, during which movement the grain is suitably soaked and raised to the desired temperature. The temperature of the water and grain in the trough is maintained by the steam jacket 16. After the grain is thus treated and has reached the discharge end of the trough, it is discharged therefrom by the opening of the valve 20 and the action of the conveyer. The mixed and heated grain and water discharged from the conveyer trough 10 falls into the inner chamber 26 of a two-chambered vat or receptacle below consisting of said inner chamber 26 and an outer chamber 27 surrounding the inner chamber. The walls of the inner chamber 26 are perforated so as to make the same pervious to water but impervious to the kernels of corn, thus acting as a strainer for separating the water from the grain, the water passing therefrom into the outer chamber. The dimensions of the outer chamber are preferably proportionately greater with reference to the dimensions of the inner chamber, and I find in practice that the dimensions of the outer chamber should be at least twice the capacity of the inner chamber in order that there may be always at least twice as much water as grain in this part of the mechanism. A vent pipe 28 extends upward from the upper part of the chamber 27 for the purpose of preventing a vacuum in said chamber. The outlet is controlled by a slide valve 30 operating in the valve casing 31. It is seen, therefore, that the purpose of this part of the mechanism is to measure rather accurately the charge of grain for the separator below. Hence, it is necessary to temporarily separate the water from the grain so as to measure the grain and predetermine the desired amount of grain to discharge below into the separator, for the chief object of the separator herein is to remove the hulls by the friction of the water moving in the separator engaging with the hulls and grains and without the hulls and grains striking against any hard parts of the separator, whereby the grains after being hulled are whole. It is desirable that not too much grain be admitted at any one time into the separator for then the grain would be ground against the drum or wall of the separator and be broken. Hence, the grain is measured in the perforated chamber 26 while temporarily separated from the water and therefore the full charge of grain and the water in said measuring tank are discharged into the separator below. The water and grain pass then through the spout 32 into the hopper 33 which is mounted upon the separator casing 34. The separator consists of the casing 34 forming a chamber or vat in the form of a truncated cone with the upper end in open connection with the hopper and with the lower end closed. The separator casing 34 is mounted upon the top of the stand 35.

Within the separator casing 34 a drum 36, in the form of a truncated cone but of considerably less diameter than the casing 34, is secured upon the perpendicular shaft 37.
This shaft is mounted at its lower end on the top of the stand 35 and in suitable bearings at its upper end on the cross beam 38. It is driven by the pulley 39 at the top. The surface of the drum 36 is provided with a large number of radially projecting fingers or stirrers 40. The heated mixture of water and grain, when discharged into the separator occupies the large space between the drum 36 and the wall 34 and it is violently agitated and driven in a rotating motion by the action of the drum and stirring fingers thereof, until the mixture is thrown practically into the form of a rapidly revolving fluid cone between the drum and separator wall. This treatment of the mixture thoroughly strips and cleans the outer skin or hull from the kernel which is due to the sole agency of the violently agitated body of water and without any friction, bruising or grinding. When the grain is thus freed from all outer skin or hull the entire body of water, grain and freed hulls is quickly discharged by the opening of the properly timed slide valve 45 that is vertically disposed in the valve casing 46 at one side of the lower part of the separator casing 34, as shown in Fig. 4. The mixture then passes through the spout 47 into a conveyer trough 48. This trough is partially cylindrical in cross section and the walls thereof are perforated to allow the water to drain off into the outer trough 49 and leave solids in the trough 48. The solids are conveyed in said trough by the screw conveyer 50 throughout the length of the trough 48, so that there is an effectual removal of the fluids. The lighter hulls and bran will also pass from the grain with the water into the outer trough. At the discharge ends of said troughs 48 and 49 the material therein is discharged respectively into tanks 51 and 52.

In the operation of this device the various slide valves 20, 30 and 45 are timed in their action and in their sequence of movement. It is desirable that they hold the grain and water in the receptacles above them long enough to permit the proper treatment and it is also desirable that a receptacle be emptied before the grain and water are discharged into it from the receptacle above. Hence, it is preferable that the lower valve open first, the middle valve next and the upper valve last. It is also desirable that these valves be quickly opened and quickly closed and that they be kept closed for a much longer period of time than open. This valve action is accomplished by a single actuating and controlling means. On the stand 60 there is a driving shaft 61 which carries a cam wheel 62. This cam wheel is provided with two cam grooves in its faces, the groove 64 on one side and the groove 65 on the other side. Each of these cam grooves consists chiefly of a portion concentric with the axis of the cam wheel for holding the valve closed and at one point the groove extends outward sharply toward the periphery of the cam wheel to form a point 66 for causing the sudden opening and closing of the valve. The outwardly extending points of these cam grooves are arranged in a certain relation with each other so that they will bring about the desired sequence of opening movement of the valves. To this end the space on the periphery of the cam wheel between the outwardly extending points of each pair of cam grooves is about one-third of the circumference of the wheel.
This may be varied of course to suit the work desired.

The cam groove 64 actuates the bar 70 secured adjustably on the shaft 71 mounted in the bearing 72 in the frame upright 73.
The crank shaft 71 has a crank at its other end which is connected by the rod 74 with one end of the bell crank 75 and the other end of said bell crank is connected with the upper valve 20 by the connecting rods 76.
The cam groove 64 also actuates one arm of the bell crank 77 mounted on the upright 73 and the other end of said bell crank is connected with the middle valve 30 by the connection 78. The cam groove 65 on the other side of the cam wheel actuates a lever 80 fulcrumed at 81 on the upright 73 and connected with the lower valve 45 by the connection 82. An upright 83 constitutes a part of the frame work for supporting the various parts. The levers 70 and 77 are mounted relatively so that the point of the groove 64 will actuate lever 77 about a third of a revolution before it actuates lever 70. It is thus seen that each valve will be held closed during the far greater revolution of the cam wheel and that the lower valve will be opened first for the discharge of the material from the separator before the middle valve is opened for discharging material from the measuring device into the separator, and the middle valve will be opened before the upper valve is opened for discharging the material from the hot water treating mechanism into the measuring device. This will cause each chamber to be emptied before it is subsequently filled.

What I claim as my invention and desire to secure by Letters Patent is:

1. In apparatus for removing hulls and the like from cereals, means for measuring the charge of grain and proportioning the relative quantities of water and grain therein comprising an outer shell to form a water chamber with an outlet at the lower end thereof, an inner shell forming a grain chamber open at the upper end to receive the grain and water and open at the lower end over the discharge from the water chamber and perforated so as to permit the partial separation of water from the grain, a valve for closing the upper end of the inner shell, and a valve for closing the lower end of the outer shell, substantially as set forth.

2. In apparatus for removing hulls and the like from cereals, means for mixing water and the grain for softening the hulls thereof, a valve for opening and closing the outlet from said heating and softening means, a perforated chamber below said outlet for receiving the grain and water, a water chamber surrounding said grain receiving chamber, a valve for closing and opening the outlet from said water chamber, and means for operating said valves successively, substantially as set forth.

3. In apparatus for removing hulls and the like from softened cereals, a vertically disposed cylindrical tank with a smooth internal surface in which the softened grain and water may be introduced at the top, a vertically disposed revolving drum centrally mounted in said tank, said drum tapering upwardly and with means on its surface for causing a swirling movement of the water and grain as the drum revolves, said tank and drum being provided with a relatively large chamber between the drum and tank surface for the free movement of the grain and water, whereby the kernels of the grain will not be mashed or broken, means for discharging a certain amount of softened grain into the upper end of said tank, and a valve controlled outlet at the lower end of said tank.

4. In apparatus for removing hulls and the like from cereals, the combination of a water treating mechanism, means into which the water and grain are discharged therefrom for measuring the charge of grain and proportioning the relative quantities of hot water and grain, a vertically disposed cylindrical tank in position to receive the measured charges of grain and water, a vertically disposed drum centrally mounted in said tank, said drum tapering upwardly and with means on its surface for causing a slow movement of the water and grain when the drum is revolved, a valve for controlling the discharge of the grain and water from said measuring mechanism and said tank, means for operating said valve intermittently substantially as set forth, and a hull separating means into which said charge of grain is discharged from said vertically disposed tank.

In witness whereof, I have hereunto affixed my signature in the presence of the witnesses herein named.

GEORGE E. HENRY.

Witnesses:
C. B. KESSINGER,
C. E. DAILEY.